(12) United States Patent
Winther

(10) Patent No.: US 10,685,052 B2
(45) Date of Patent: Jun. 16, 2020

(54) METHOD OF AND SYSTEM FOR INFORMATION RETRIEVAL

(71) Applicant: Danmarks Tekniske Universitet, Kgs. Lyngby (DK)

(72) Inventor: Ole Winther, Hellerup (DK)

(73) Assignee: Danmarks Tekniske Universitet, Kgs. Lyngby (DK)

( * ) Notice: Subject to any disclaimer, the term of this patent is extended or adjusted under 35 U.S.C. 154(b) by 68 days.

(21) Appl. No.: 15/101,592

(22) PCT Filed: Dec. 12, 2014

(86) PCT No.: PCT/EP2014/077575
§ 371 (c)(1),
(2) Date: Jun. 3, 2016

(87) PCT Pub. No.: WO2015/086824
PCT Pub. Date: Jun. 18, 2015

(65) Prior Publication Data
US 2016/0306877 A1  Oct. 20, 2016

(30) Foreign Application Priority Data

Dec. 13, 2013 (EP) ..................................... 13197257

(51) Int. Cl.
*G06F 16/35* (2019.01)
*G06F 16/93* (2019.01)
(Continued)

(52) U.S. Cl.
CPC ............ *G06F 16/35* (2019.01); *G06F 16/316* (2019.01); *G06F 16/334* (2019.01); *G06F 16/93* (2019.01); *G06F 16/951* (2019.01)

(58) Field of Classification Search
CPC ......... G06F 17/30705; G06F 17/30011; G06F 17/30619; G06F 17/30675;
(Continued)

(56) References Cited

U.S. PATENT DOCUMENTS 5,265,065 A * 11/1993 Turtle ................. G06F 16/3346
5,905,980 A *  5/1999 Masuichi .......... G06F 17/30616
707/700

(Continued)

OTHER PUBLICATIONS

Chakrabarti et al. "Scalable feature selection, classification and signature generation for organizing large text databases into hierarchical topic taxonomies," The VLDB journal 7.3 (1998): 163-178. (Year: 1998).*

(Continued)

*Primary Examiner* — Jay A Morrison
(74) *Attorney, Agent, or Firm* — Knobbe Martens Olson & Bear, LLP

(57) ABSTRACT

This invention relates to a system for and a method (100) of searching a collection of digital information (150) comprising a number of digital documents (110), the method comprising receiving or obtaining (102) a search query, the query comprising a number of search terms, searching (103) an index (300) using the search terms thereby providing information (301) about which digital documents (110) of the collection of digital information (150) that contains a given search term and one or more search related metrics (302; 303; 304; 305; 306), ranking (105) at least a part of the search query search result according to one or more predetermined criteria providing a ranked search result, and providing at least a part of the ranked search result (106), wherein the ranking provides robust likelihood for low count terms by using the one or more search related metrics (302; 303; 304; 305; 306). In this way, a method of and a system for information retrieval or searching is readily provided that (Continued)

enhances the searching quality (i.e. the number of relevant documents retrieved and such documents being ranked high) when (also) using queries containing many search terms.

16 Claims, 3 Drawing Sheets

(51) Int. Cl.
*G06F 16/33* (2019.01)
*G06F 16/951* (2019.01)
*G06F 16/31* (2019.01)

(58) Field of Classification Search
CPC .. G06F 17/30864; G06F 16/35; G06F 16/334; G06F 16/93; G06F 16/316; G06F 16/951
See application file for complete search history.

(56) References Cited

U.S. PATENT DOCUMENTS

| | | | | |
|---|---|---|---|---|
| 6,137,911 | A * | 10/2000 | Zhilyaev | G06F 17/30707 345/440 |
| 8,407,217 | B1 * | 3/2013 | Zhang | G06F 17/28 707/708 |
| 8,788,431 | B1 * | 7/2014 | Shao | G06Q 50/16 345/629 |
| 9,623,119 | B1 * | 4/2017 | Kim | A61K 48/00 |
| 2012/0151223 | A1 * | 6/2012 | Conde Marques | G06F 21/575 713/193 |
| 2013/0103681 | A1 * | 4/2013 | Renders | G06F 17/30 707/728 |
| 2015/0088888 | A1 * | 3/2015 | Brennan | G06F 17/30598 707/737 |

OTHER PUBLICATIONS

Zhai et al., "A study of smoothing methods for language models applied to ad hoc information retrieval", in Proceedings of the 24th Annual International ACM SIGIR Conference on Research and Development in Information Retrieval, Sep. 9-13, 2001, New Orleans, LA., USA, pp. 334-342. (Year: 2001).*

Martin-Bautista, M. J., et al. "Mining web documents to find additional query terms using fuzzy association rules." Fuzzy Sets and Systems 148.1 (2004): 85-104. (Year: 2004).*

Carpineto, Claudio et al., "A Survey of Automatic Query Expansion in Information Retrieval" ACM Computing Surveys, Jan. 2012, pp. 1-50, vol. 44, No. 1.

Dragusin, Rado et al., "FindZebra: A search engine for rare diseases" Abstract—Published online Feb. 26, 2013 http://www.ijmijournal.com/article/S1386-5056(13)00016-6/abstract.

Dragusin, Rado et al., "FindZebra: A search engine for rare diseases" International Journal of Medical Informatics, Jun. 2013, pp. 528-538, vol. 82, No. 6.

Ferrucci, David et al., "Watson: Beyond Jeopardy!" Artificial Intelligence, 2012, pp. 1-13.

Strohman, Trevor "Dynamic Collections in Indri" Technical Report IR-426, Jan. 2005, pp. 1-16.

Yuan, Michael J. "Watson and healthcare—How natural language processing and semantic search couldrevolutionize clinical decision support" IBM DeveloperWorks, Apr. 12, 2011, pp. 1-11.

International Search Report for PCT/EP2014/077575 dated Mar. 19, 2015.

* cited by examiner

Index & search related metrics

| Document (D) | Term (q_i) | Freq. (fq_i;D) | Freq. (cq_i) | (|D|) | (|C|) |
|---|---|---|---|---|---|
| Doc_x | Word_A | (fWord_A; Doc_x) | (cWord_A) | (|Doc_x|) | XXX |
| | Word_B | (fWord_B; Doc_x) | (cWord_B) | | |
| | Word_C | (fWord_C; Doc_x) | (cWord_C) | | |
| | ⋮ | ⋮ | (cWord_D) | | |
| Doc_y | Word_A | (fWord_A; Doc_y) | ⋮ | (|Doc_y|) | |
| | Word_D | (fWord_D; Doc_y) | | | |
| | Word_F | (fWord_F; Doc_y) | | | |
| ⋮ | ⋮ | ⋮ | | | |

300

METHOD OF AND SYSTEM FOR INFORMATION RETRIEVAL

CROSS REFERENCE TO RELATED APPLICATIONS

This application is a U.S. National Phase Application of PCT International Application Number PCT/EP2014/077575, filed on Dec. 12, 2014, designating the United States of America and published in the English language, which is an International Application of and claims the benefit of priority to European Patent Application No. 13197257.2, filed on Dec. 13, 2013. The disclosures of the above-referenced applications are hereby expressly incorporated by reference in their entireties.

FIELD OF THE INVENTION

The present invention relates generally to a method of (and corresponding system for) searching a collection of digital information comprising a number of digital documents, the method comprising receiving or obtaining a search query, the query comprising a number of search terms, searching an index using the search terms thereby providing information about which digital documents of the collection of digital information that contains a given search term and one or more search related metrics, ranking at least a part of the search result according to one or more predetermined criteria providing a ranked search result, and providing at least a part of the ranked search result.

BACKGROUND OF THE INVENTION

Speedy and quick information retrieval systems and methods e.g. like web based search engines and the use thereof are increasingly important and popular tools within many business areas as well as for private use.

Web based search engines e.g. like the ones provided by Google and other companies are popular due to being quick to deliver a search result and easy to use for most users. The search engines are optimised in various ways to provide links to documents or web-pages (forth only denoted documents) where the retrieved documents often are sorted or ranked based on containing the provided key-words specified in the search as well as the popularity of the retrieved document in some form(s). The popularity measure(s) or metric(s) may include how often a given document is linked to by other documents or sources and how popular they themselves are (PageRank), user visit rates, and/or other forms of user recommendation. Such measures favour documents with many in-links (backlinks) or results often viewed by users.

Focus on quickly returning a search result by such search engines entails some trade-offs and they are often optimised for search queries containing a few keywords, typically about 2-3.

This makes such search engines less usable for certain tasks, areas, or domains. Not related to speed of delivering the search result but related to the relevance of the retrieved documents of the search result.

Within the area of medically related information, the internet has become a primary source of information about illnesses and/or treatments with an exponential growth in both volume and amount of entries available. This source of information is used by both non-expert and expert medical users e.g. in the form of private persons and medical professionals.

One example of a medical expert is e.g. a clinician that may use web-based search engines e.g. used in assisting with the iterative cycle of hypotheses about a given disease being formulated from evidence followed by the collection of additional discriminating evidence.

One medically related area where current web-based search engines do not perform well is e.g. the area related to rare or so-called orphan diseases. The exact definition of what constitutes a rare or orphan (forth only denoted rare) disease e.g. in terms of prevalence, threshold, and requirement for severity various across the globe, but a disease may be said, in general, to be rare if it affects fewer than about one in two thousand individuals. Currently around seven thousand rare diseases are known and it is estimated that about 6-8% of the population will be affected by a rare disease during their lifetime. Due to their rarity and large number, ordinary diagnosis of rare diseases is difficult and often associated with year long delays and diagnostic errors.

A study Rare Diseases (EURORDIS) e.g. showed that 40% of rare disease patients were wrongly diagnosed before the correct diagnosis was given and that 25% of patients had diagnostic delays ranging between 5 and 30 years.

One reason for current web-based search engines also not performing well or optimally within this particular area is due to precisely the fact that such diseases are rare and thus any ranking of relevance of a document source using a popularity-based measure or metric will tend to disregard them. Information of rare diseases is (relatively) very sparse and less hyperlinked than other medical content.

Additionally, efficiency concerns may have led to brute-force index pruning e.g. by removing low frequency terms and/or terms that are (relatively) unusually long (e.g. removing the term "hydrochlorofluorocarbons"), which is not beneficial when retrieving relevant documents related to rare diseases.

Another reason is, as mentioned, that most current web-based search engines are optimised for very short queries (often about 2-3 terms long) whereas a useful medically related query comprising of patient symptoms (both for rare and non-rare diseases) and/or characteristics of a patient usually needs to be much longer to be meaningful. They may e.g. easily be as long as 10-20 terms.

Furthermore, such relevant queries often contain symptoms expressed as multi-word units. But most current web-based search engines often make term independence assumptions in order to increase efficiency. As an example, most current web-based search engines will not distinguish between the two different queries "sleep deficiency, increased sexual appetite" and "sexual deficiency, increased sleep" hence returning non-relevant search results.

Furthermore, some symptoms listed in a query may not apply to the given correct disease and/or some pertinent symptoms for the given correct disease may be missing from the query because they are masked under different conditions. However, many or most current web-based search engines are designed to maximise the match between all the query terms and the returned documents.

Specific medical decision support or expert systems have also existed for quite a long time and a number of success stories exist. However, they require user training and a relatively high cost of keeping information up to date and expand it, requiring the use of experts, which has hindered a widespread and sustained use. It may virtually be impossible to keep such a system up to date, especially in fields like medicine, where the amount of information found in textbooks, cases studies, research articles, etc. doubles approximately every 5 years.

OBJECT AND SUMMARY OF THE INVENTION

It is an object to provide a method and corresponding system that readily enables information retrieval or searching in a collection of digital information, in particular a collection of digital information that contain information sources comprising important low count terms, i.e. terms being important or significant but not having a high frequency within a given document.

Additionally, an objective is to provide a method and corresponding system that enables this in an efficient, quick, and/or reliable manner.

A further object is to enable a searching method and corresponding system that allows for a simple user interface.

Yet a further object is to provide a searching method and corresponding system that are efficient for both search queries comprising both few and many search terms, i.e. more than at least 3, and e.g. more than 10.

According to one aspect, one or more of these objects are achieved at least to an extent by a method of searching a collection of digital information comprising a number of digital documents, the method comprising receiving or obtaining a search query, the query comprising a number of search terms, searching an index using the search terms thereby providing information about which digital documents of the collection of digital information (150) that contains a given search term and one or more search related metrics, using predetermined statistical modelling results to identify one or more additional terms comprised by the predetermined statistical modelling results that are statistically related to the search terms or terms in the documents, wherein at least one of the search related metrics specifies the additional terms and/or specifies the one or more relations between the additional terms and the search terms or terms in the documents, ranking at least a part of the search result according to one or more predetermined criteria providing a ranked search result, and providing at least a part of the ranked search result, wherein the ranking is performed according to a determined relevance of individual documents in the least a part of the search result.

The use of predetermined statistical modelling results is an optional step. However, this optional step may advantageously improve the search by bringing in additional related search terms which may result in relevant documents which would not otherwise have been retrieved.

The search related metrics generally specifies one or more relations or characteristics between a given search term, the individual documents of the collection, possibly the collection, and/or additional terms from the index documents or other documents (e.g. additional terms from predetermined statistical modelling results).

One or more of the steps of 1) ranking at least a part of the search result according to one or more predetermined criteria providing a ranked search result, 2) providing at least a part of the ranked search result, and 3) ranking performed according to a determined relevance of individual documents in the least a part of the search result may be seen as optional features that may be dispensed with or replaced by other features according to embodiments of the invention.

In this way, a method of information retrieval or searching is readily provided that enhances the searching quality (i.e. the number of relevant documents retrieved and such documents being ranked high) when (also) using queries containing many search terms.

The searching results may be used for deriving a medical diagnosis of a patient, by searching medically related documents. Accordingly, the method may be particularly suited for deriving a medical diagnosis of a patient based on the ranking of search results.

Advantageously, the medical use of the method may improve diagnosing rare diseases. This may be obtained according to the searching method wherein search terms may be constituted by collected patient specific information, i.e. non-public information is used in the query as a basis for determining best-matching documents from the collection of digital information, i.e. a collection of publically available information.

Accordingly, even though the specific combination of search terms in the query is not contained in any specify document, the searching method may be able to determine documents which are relevant for determining a diagnosis.

For example, the non-public information of the query may comprise terms derived from:

a medical history of a patient based on subjective symptoms, clinical signs of a patient obtained during a physical examination, and/or laboratory data of a patient's biochemical tests.

In one possible embodiment, the index comprises one or more selected from the group of:

a unique identifier of substantially every digital document being part of the collection, a total number of documents in the collection, a total number of search terms for substantially each given digital document being part of the collection (150), every search term for substantially each given digital document being part of the collection, a frequency of a given search term (303) for substantially each digital document it is comprised in, and for substantially each search term, a frequency (304) of that particular search term in the entire collection of documents (304).

In another possible embodiment, the ranking uses an assumption of independence of terms within at least some of the digital documents of the collection of digital information.

This may promote high quality searching in digital documents.

According to the optional embodiment which comprises using predetermined statistical modelling results to identify additional terms comprised by the predetermined statistical modelling results that are statistically related to the search terms or terms in the documents, the searching may comprise searching using the search terms augmented with the statistically related additional terms, and/or searching the index which have been augmented with the statistically related additional terms.

The predetermined statistical modelling result may comprise the relations between the additional terms obtained from a plurality of digital documents and the search terms or terms in the documents, wherein the relations comprise a statistical strength indicating a probability of relatedness between the terms.

Further, according to this embodiment, the determined relevance may be used for ranking may be determined taking into account the statistically related terms.

According to an embodiment, the method further comprises extracting gene names from the documents in the search result, and presenting the search result dependent on an estimated relevance of the extracted gene names.

According to this embodiment the steps of ranking at least a part of the search result according to one or more predetermined criteria providing a ranked search result, and providing at least a part of the ranked search result, wherein the ranking is performed according to a determined relevance of individual documents in the least a part of the search result may be omitted.

In a related embodiment the method comprises presenting the extracted gene names in order of the estimated relevance, or clustering the documents in the search result according to gene names appearing in the documents and according to the estimated relevance of the extracted gene names.

In a related embodiment the method (comprising gene name extraction) is for supporting diagnosing genetic diseases.

A genetic disease, specifically a rare genetic disease is characterized by genetic changes that cannot easily be directly connected to a phenotype of the patient. Diagnosing difficult medical cases is achieved today by sequencing and analyzing a patient's genome, where the genome analysis extracts genes that varies from the normal. Gene variants are abundant in each individual and prioritization is an issue. Prioritizing what gene variants are relevant for a patient with his/her known phenotype is the biggest challenge in clinical genetics.

Accordingly, the support of diagnosing of genetic diseases may be based on gene variant prioritization wherein the gene variant prioritization is obtained according to the searching and ranking steps of the first aspect of the invention.

In one embodiment, the ranking provides robust likelihood for terms using the one or more search related metrics, wherein the robust likelihood is provided using either Dirichlet smoothing or Jelinek-Mercer smoothing or a combination hereof.

Using these smoothing functions (or similar) in the ranking increases the number of relevant retrieved documents ranked as high for searches using queries containing many search terms.

In one embodiment, one or more digital representations of at least one relation for a given digital document to at least one other given digital document and a type or description of the relation(s) is stored and wherein the method comprises presenting, in a graphical user interface, the digital documents and their relation(s) and their type(s) to a user, whereby a user may see which documents are related and by what type and furthermore be able to navigate or browse the documents using the relation(s).

In one embodiment, the digital documents are medically related and the method comprises clustering digital documents of the at least a part of the ranked search result together according to concepts of the standardised Unified Medical Language System resulting in a clustered search result.

The concepts may e.g. be automatically derived from the document title.

In one embodiment, when the clustered search result is presented and if selected by a user, the selected cluster is expanded to reveal information on the documents it contains, e.g. sorted by rank, thereby allowing a user to zoom in on documents of interest.

In one embodiment, the method comprises assigning a trustfulness score to each digital document or to a group of similar digital documents where the trustfulness score is taken into consideration during ranking so digital documents with a relatively low trustfulness score is disregarded or ranked less.

In one embodiment, the method comprises using topic models learning co-variation patterns across terms and documents, e.g. defining what terms effectively have the same meaning.

In one embodiment, the method further comprises using ontologies to identify example multi-word terms and, for medically related digital documents, symptoms in the digital document.

According to the above embodiments relating to using topic model, and ontologies, these embodiments may be used for searching using the search terms augmented e.g. with same-meaning-terms or multi-word synonymous, and/or searching the index which have been augmented in this way. Further, the same-meaning-terms or multi-word synonymous may be used for ranking.

In one embodiment, the method further comprises explicitly taking into account search query and digital document context by binding concepts together from sentence units.

In one embodiment, the digital documents relate to rare or orphan diseases.

The invention also relates to a system (and embodiments thereof) for searching a collection of digital information comprising a number of digital documents, the system comprising at least one processing unit and an electronic memory and/or storage, wherein the system is adapted to execute the method (and embodiments thereof).

A further possible aspect of the invention relates to a method for supporting diagnosing genetic diseases on basis of searching a collection of digital information comprising a number of digital documents, the method comprising receiving or obtaining a search query, the query comprising a number of search terms, searching an index using the search terms thereby providing information about which digital documents of the collection of digital information that contains a given search term and one or more search related metrics, optionally, using predetermined statistical modelling results to identify one or more additional terms comprised by the predetermined statistical modelling results that are statistically related to the search terms or terms in the documents, wherein at least one of the search related metrics specifies the additional terms and/or specifies the one or more relations between the additional terms and the search terms or terms in the documents, extracting gene names from the documents in the search result, and presenting the extracted gene names in order of an estimated relevance, or clustering the documents in the search result according to gene names appearing in the documents and according to the estimated relevance of the extracted gene names.

BRIEF DESCRIPTION OF THE DRAWINGS

These and other aspects will be apparent from and elucidated with reference to the illustrative embodiments as shown in the drawings, in which.

DESCRIPTION OF PREFERRED EMBODIMENTS

Figure 1:
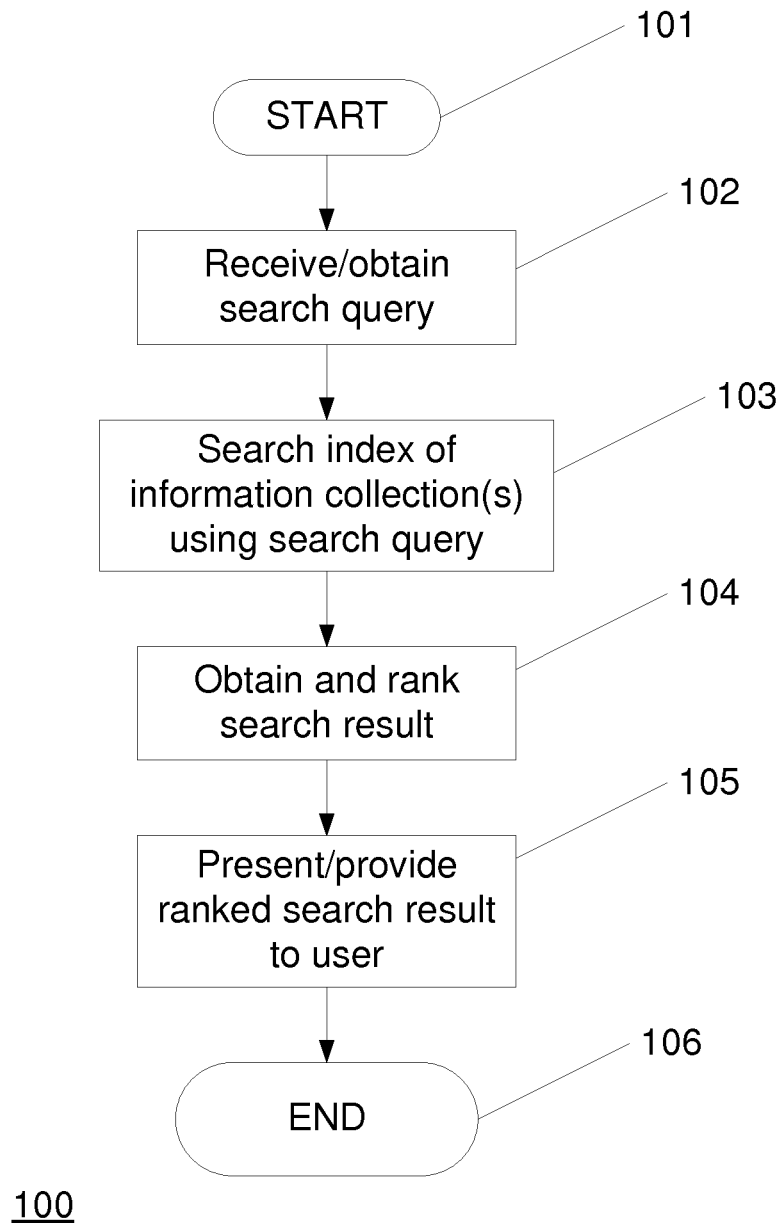
FIG. 1 schematically illustrates one embodiment of a method of searching a collection of digital information comprising a number of digital documents.

FIG. 1 schematically illustrates one embodiment of a method of searching a collection of digital information comprising a number of digital documents.

Illustrated is one embodiment of a method of searching a collection of digital information that starts or initiates at step 101.

At step 102, a search query for searching the collection of digital information is obtained or received e.g. from a user. Preferably, a simple user interface is provided comprising at least an input text box where a user simply may enter the search query. The search query comprises a number of search terms. The user interface may also comprise other elements as relevant and/or as described elsewhere.

It is to be understood that the user may use a separate device or system (i.e. a client device/system) than the device or system actually carrying out the search (i.e. a server or central device/system). Alternatively, it may also be a single device or system.

At step 103, a search or look-up is carried out using the search terms of the search query and a predetermined or pre-generated (although not necessarily static) digital representation of an index or similar for the collection of digital information. More specifically, the index is searched or consulted for each search term of the query to provide information about which documents of the collection that contains a given search term and potentially additional search related metrics specifying one or more relations or characteristics between a given search term, the individual documents of the collection, and possibly the collection.

The index for a given collection of digital information comprising a number of digital documents is typically initially generated once and used for some time (but may e.g. be modified/updated later as necessary or useful) and may more or less be provided in many ways as generally known.

Basically, the index maps which words or terms (forth the only denoted terms) exist in which documents potentially together with one or more search related metrics for each term, document, and/or the entire collection. See e.g. FIG. 2 for one schematic exemplary embodiment of an index.

The search related metrics may e.g. comprise one or more of: for each term in a given document, a frequency of the given term in the given document (i.e. how many times a given term occurs in a given document); a frequency of a given term in the collection of all documents; and for each document, the number of terms in a given document; the number of documents in the entire collection. The search related metrics may also comprise other metrics, parameters, and/or characteristics.

The index and the search related metrics may be used in ranking the relevant documents being retrieved where the general aim is to reliably rank the retrieved documents decreasingly according to which documents are estimated as most relevant and/or have a higher likelihood of being (most) relevant (i.e. so the document being most relevant/with the highest likelihood of being most relevant is ranked first/at the top). This will be explained in further details below in connection with step 104.

If the collection of digital information is updated, the index should also be updated, but due to efficiency purposes normally not necessarily at every new added/changed document. The index may e.g. be updated every three months or so but of course depending on the amount of changes in the collection.

In at least some embodiments, general (so-called stop-words) and/or non-relevant terms like 'the', 'a', and so on may be removed or omitted from the index thus increasing the efficiency (as less information needs to be processed and/or stored) and/or the quality (as potential 'noise' is removed) of the search. Furthermore, word stemming may also be applied, i.e. reducing words e.g. 'fishing', 'fisher', etc. to all become 'fish' in order to enhance retrieval.

To provide meaningful search results within a given area, the quality and relevance of the collection of digital information are important and the number of digital documents in the collection may be important as well, i.e. a certain amount of documents are preferred to build up a reliable corpus.

At step 104, data or information obtained at step 103 from the index and the search query, i.e. information about which documents of the collection that contains a given search term and potentially additional search related metrics, are used to rank the documents containing the search terms according to (estimated) relevance/likelihood of relevance, i.e. the document having highest relevance/likelihood of relevance is ranked first, followed by the document with the second highest relevance/likelihood of relevance, etc.

There are generally many different ways of ranking documents retrieved by searching using a query and optimal ranking algorithms may depend on the aim of the search and the specific corpus or collection of documents used.

The inventors have found out that providing ranking having robust likelihood for low count terms significantly enhances the use (i.e. the number of relevant documents retrieved and such documents being ranked high) of the searching method and embodiments thereof when using queries containing many search terms. The ability to use many search terms are very important within certain areas, such as medially related searches.

Furthermore, the inventors have found out that providing ranking using an assumption of independence of terms within at least some of the digital documents of the collection of digital information further enhances the usability of the searching method en embodiments thereof when used on a collection of documents containing important low count terms in particular in combination with the above.

Preferably, the assumption of independence of terms may be for all or substantially all of the digital documents; of course realising that if 95% or another high percentage of the documents have such an assumption of independence, the method may work almost as good and still better than other current prior art methods.

For example, ranking documents using an assumption of independence of terms may be performed by calculating the sum of probabilities of search terms contained in documents of the search result and ranking according to the calculated sums. The probability of a search term may be determined from the index entries, i.e. from the frequency (303) off a given search term in a digital document, and the frequency (304) of that particular search term in the entire collection of documents (304). Search terms having low probabilities may provide a higher ranking score than terms with high probabilities so that common search terms (like "high") do not boost the ranking score compared to more essential search terms.

In one embodiment, the ranking step comprises using a query likelihood ranking model with Jelinek-Mercer or Dirichlet smoothing or a combination hereof. The respective equations for Jelinek-Mercer and Dirichlet smoothing are:

$$p(q|D) = \prod_{i=1}^{N} (1-\lambda)\frac{fq_{i,D}}{|D|} + \lambda\frac{cq_i}{|C|} \quad (1)$$

$$p(q|D) = \prod_{i=1}^{N} \frac{fq_{i,D} + \mu\frac{cq_i}{|C|}}{|D| + \mu} \quad (2)$$

Where N is the number of search terms in the query; p(q|D) is the probability of query given document D. These expressions are calculation for each document and the documents are ranked according to a combination of these. $f_{q_{i,D}}$ is the frequency of search or query term (throughout the description used interchangeably) i in document D; $cq_i$ is the frequency of $q_i$ in the collection of all documents; |D| is the number of terms in document D; |C| is the number of documents in the collection of all documents, $\lambda$ is the so-called Jelinek-Mercer smoothing parameter ($0 \leq \lambda \leq 1$); and $\mu$ is the Dirichlet smoothing parameter.

Using these smoothing functions in the ranking dramatically increases the number of relevant retrieved documents ranked high for searches using queries containing many search terms.

These smoothing functions also assume of independence of terms within a given document increasing the searching quality when searching a collection of documents containing important low count terms.

The inventors have successfully obtained very satisfactory results using these ranking methods with $\mu=2500$ and $\lambda=0.9$.

It is to be understood that such parameters may be different and may be optimised depending on the specific contents of the documents in the collection.

Using only one of the smoothing functions in ranking will also increase the searching quality for quires containing many search terms compared to certain prior art methods but generally not as much as using both.

After the documents have been ranked, they are provided and/or presented to a user as the search result at step 105 after which the method ends at step 106.

In some embodiments, it may be that only a given number, e.g. 20, of the highest ranking documents are presented as a search result. Such a number may also be specified by the user.

In this way, a method (and corresponding system) readily, reliably, relatively quickly and/or efficiently enables information retrieval or searching in a collection of digital information, in particular for searching in a collection of digital information that contain information sources comprising important or significant low count terms.

Additionally, the searching method (and corresponding system) readily handles a query comprising a relatively large number, e.g. 10+, of search terms.

Additional further improvements will be discussed in detail later.

In one embodiment, the data sources are related to documents describing rare diseases, their symptoms, and other related information thereby enabling search among descriptions of rare medical diseases. This may be used in diagnosing rare diseases using a search query containing symptoms and/or conditions and/or other facts as search terms. The inventors have built and evaluated a collection of digital information comprising the following online and publically available rare disease resources:

Online Mendelian Inheritance in Man (OMIM)
  http://www.ncbi.nlm.nih.gov/omim
Genetic and Rare Diseases Information Center (GARD)
  http://rarediseases.info.nih.gov/GARD
Orphanet
  http://www.orpha.net
Wikipedia
  http://www.wikipedia.org/
National Organization for Rare Disorders (NORD)
  http://rarediseases.org
Genetics Home Reference
  http://ghr.nlm.nih.gov
Madisons Foundation Rare Paediatric Disease Database
  http://www.madisonsfoundation.org
About.com Rare Disease Database
  http://rarediseases.about.com
Health on the Net Foundation Rare Disease Database
  http://www.hon.ch
Swedish National Board of Health and Welfare
  www.socialstyrelsen.se/rarediseases comprising more than 33.000 documents relating to rare diseases as a corpus of information. It is to be understood that other sources may be included or used instead and fewer sources than the listed ones may also be used. The listed sources contain medically related documents being highly curated consensus articles on single diseases, which assures the quality of the documents.

Even though rare disease has been discussed as a primary area for use and primary embodiments, it is to be understood that other areas or domains can also benefit from the present invention. Such areas or domains are generally specialized domains where a number of high quality curated sources exist.

This can within the medical domain be e.g. toxicology and information retrieval from medical case reports. Other application domains are quite abundant and are e.g. information related to computer games (wikis, etc.) and (sub-)categories in Wikipedia and other encyclopedia.

Additionally, a number of enhancements may be implemented as described in the following.

Some enhancements relate to the use of the so-called UMLS (Unified Medical Language System).

According to one aspect, the documents (being medically related) retrieved by a search are clustered together according to UMLS medical concepts (i.e. diseases) e.g. derived from the document title. According to another aspect, the ranking is done based on the UMLS concepts as opposed to ranking based more directly on the documents.

Both aspects aim to facilitate cases where several documents covering the same disease is retrieved. The aim is to select and group these documents in flexible ways that, on the one hand, can facilitate a user's navigation through the retrieved results, and on the other hand, allow the display of a potentially more diverse set of results which considers the top j retrieved documents instead of the top n retrieved documents; j>n). j may e.g. be 50 while n is 20.

When clustering, retrieved documents associated with the same medical UMLS concept, i.e. disease, are simply grouped together as one search result and then e.g. using the highest ranking document to represent the cluster. According to one embodiment, when the clustered search result is presented and if clicked by the user, each cluster may expand to reveal information on the documents it contains, e.g. sorted by rank, thus allowing a user to 'zoom in' on documents of interest without overloading the user with too much information initially. This provides a quick summary of the main retrieved medical conditions.

This alternative way of displaying the search result is another advantageous way of visualising the main medical concepts related to the user query.

The UMLS concept may be included in or added to the index (e.g. like the one in FIG. 2) thus making it readily available and therefore virtually not causing any extra delay of retrieval time.

Another enhancement is to augment the independent term ranking (described in connection with step 104) algorithm with topic models that learn co-variation patterns across terms and documents for example what terms that effectively have the same meaning.

For example, discomfort in lower back effectively has the same meaning as slight pain in lower back, even though the two expressions are not synonyms. Accordingly, terms in the search query may be augmented with equivalent terms having the same meaning.

Alternatively, or additionally the search terms in a document in the index may be augmented with similar equivalent terms having the same meaning using the above described topic modeling on the documents in the index. The similar or equivalent terms may be included in or added to the index.

Alternatively, or additionally the topic modeling may be used in the ranking of search results, e.g. based on the equivalent terms which have already been stored in the index. Accordingly, the ranking of a document may be changed, e.g. the ranking score may be increased, if the equivalent terms provide a better match to the search query terms than the original terms in the document In addition, a query log can be considered as an additional collection of short unlabeled documents that in a transductive (or semi-supervised) manner can be used to increase the amount of document data.

Further improvements may be enabled by using ontologies to identify for example multi-word terms and symptoms in documents and their possible multi-word synonymous. Different public available ontologies such as the UMLS ontology may be used for medically related digital documents. For example, in a medical document, the term abdominal pain constitute a multi-word term synonymous to the multi-word term stomach ache.

Both synonymous meanings, i.e. the original term and their one or more synonymous equivalents, may be are included in the index.

Alternatively, or additionally, search terms in the query may be augmented with multi-word synonymous determined by using ontologies.

The synonymous equivalents may be used in the ranking, e.g. based on equivalents included in the index The ranking algorithm described above in connection with step 104 may be seen as a simple smoothed multinomial model to rank search queries.

One enhancement is to use more general statistical topic models (e.g. like LSA (Latent Semantic Analysis), LDA (Latent Dirichlet Allocation), and extensions) that capture statistical dependencies between terms.

Topic models are in general quite flexible and well suited for extracting the dominant statistical variations in text corpora but not so much for retrieval.

An issue with topic modelling for search is that text data is in general very sparse (only a small subset of terms from a very large vocabulary is used in any given document) so adequately controlling model complexity is central for getting these models to be specific enough.

However, low rank approximations can control the complexity and allow for fast and accurate prediction, as will be explained further in the following.

One capability of a search engine is of course to be able to understand what it is being asked. It would, however, be a very useful feature of a search engine to be able to also understand what is not being asked for, i.e. identify missing pieces of information.

When a user being a medical professional clicks on a link to a retrieved document, she is implicitly exploring a hypothesis. For the selected hypothesis there exists information that can, to smaller or larger degree, add or detract to the confidence of the hypothesis.

According to this enhancement, terms in the documents for which the answers are most discriminative for the hypotheses are highlighted. The discriminative power may be extracted topic model loading (weight) assigned to each document for each term.

Highlighting and making these terms clickable for fast inclusion in the query will be of help for the user, as many false hypotheses can be discarded quickly thereby saving time.

In some cases there is a lot of information in the fact that some feature is not present. For example, if it is known that a brain tumour is always accompanied by headaches or if a certain disease only occurs within the Jewish population, the diseases can be disregarded once it is known that the patient has not had headaches or is not Jewish. This negative information is difficult to add to a standard search query, but by altering the focus of the search engine from standard search to inference, this negative information can be utilized in an effective manner.

A further enhancement is explicitly taking into account query and document context by binding concepts together from sentence units. Many search engines currently disregards information regarding word order and relations (e.g. the query "pain in left foot" should not be interpreted as just "pain" and "foot" but rather as pain located specifically in the foot). This disregard to relations has the consequence that the query "pain in left foot" will result in a high rank for the document "The patient complains of abdominal pain. He has a rash on the left foot", even though it semantically has nothing to do with the query.

For example, the system may be configured to take into account the digital document context in response to a search query by binding concepts together appearing for example within the same sentence or paragraph. Accordingly, the system may be configured to retrieve documents only if the contain terms from the query in a given context, e.g. within a single sentence or other contexts.

The context requirement may also be used in relation to ranking the search results, e.g. by increasing the ranking score of a document if that document contains the search terms in a given desired context and by decreasing the ranking score of a document if that document does not contain the search terms in the desired context.

Similar techniques can be used in regard to concept normalizations. For example, "320 mg/dL blood glucose"

should map to "Hyperglycemia" and "22 y.o. woman" should map to "young adult".

A further enhancement relates to assisting a user navigating and finding documents starting from a search result.

According to this, a user interface may highlight information that are specifically relevant e.g. for diagnosis such as discriminatory symptoms and provide the option of adding, e.g. in a free text format, test results from for example blood and X-ray.

This is done using clustering to organise documents along different feature dimensions such as symptoms, family history, medication, demographics, age, etc. This allows a user to navigate the information in a very useful way.

More specifically, this is achieved by using advanced clustering in order to interconnect or relate the documents of a collection according to a given relatedness between the document features. This may be seen as corresponding more or less to ordering the documents according to a digital representation of graph structure (i.e. containing nodes and edges/links) where the documents are nodes and the edges/links defines a relation between the documents and also the specific type of the relation.

Several types of links between the document nodes are possible and each type conveys a different kind of relatedness between the document features.

For example, assume that a search for "Jewish boy age 16, monthly seizures, sleep deficiency, aggressive and irritable when woken, highly increased sexual appetite and hunger" leads to a document that the user finds promising.

Based on features such as symptoms, family history, medication, demographics, age, etc., he will then be presented with a graph representation showing several other documents (e.g. case studies or text book references).

These documents will be connected to the selected document with edges based on the relation type (i.e. a case study with similar symptoms and demographics might be connected with two edges, one for demographics and one for symptoms).

In that way, the user will be able to see not only which documents are similar, but also how they are similar, and then use his expertise to judge which features are most relevant in the given case.

Accordingly, one or more digital representations, i.e. graph representations as described above, of at least one relation for a given digital document (110) to at least one other given digital document (110) and a type or description of the relation(s) is stored in the system for further assessment by the user. The digital documents (110) and their relation(s) and their type(s) are presented on a graphical user interface to the user, whereby a user may see which documents are related and by what type and furthermore be able to navigate or browse the documents using the relation(s).

The type or description of the relation(s) may include one or more of demographic types, symptom types, UMLS medical concept types and other relevant types capable of categorizing relations.

The advantage of this approach is that the user will have an option of browsing the feature space instead of the vastly larger document space. The user may choose whether the graph should be based on all features at the same time, or only on an importance weighted subset of the features that she finds most relevant (e.g. age and symptoms).

When choosing a new subset, the graph may be reordered to reflect the new metric for the reduced feature space.

Figure 4:
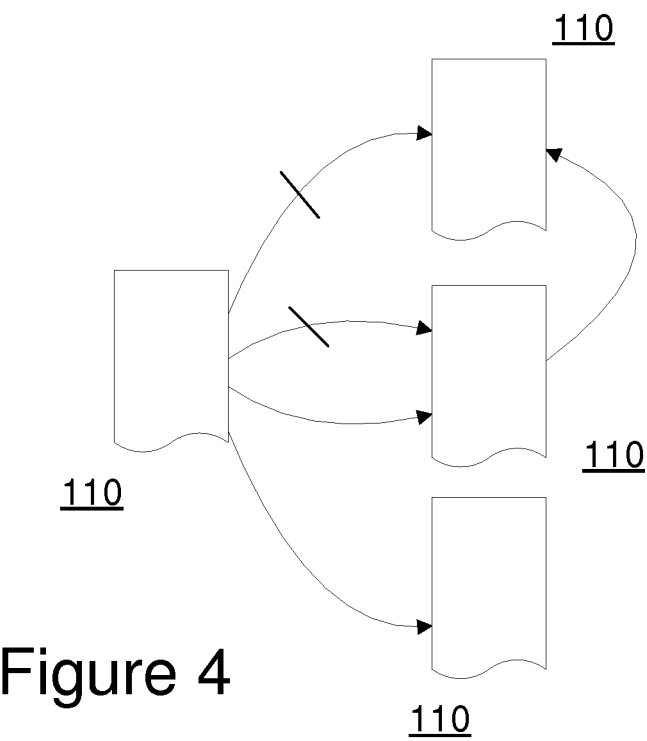
FIG. 4 schematically illustrates relations or connections between different digital documents that may be used in a suitable user interface to browse a feature space instead of a normally vastly larger document space.

This is illustrated in and explained further in connection with FIG. 4.

In addition to using a collection comprising only or mainly highly curated consensus articles on single diseases, another enhancement may be to include a large number of information sources that perhaps overall is less reliable. As long as they are handled appropriately, the addition may be beneficial.

Within the medical area, so-called case reports (publically available in PubMed—www.ncbi.nlm.nih.gov/pubmed) may be such an additional information source. Another publically available source, is e.g. casereports.bmj.com/ that contains full articles from open access journals.

Case reports are an abundant source of useful information for the physician confronted with a case with uncommon symptoms.

These so-called case reports usually describe novel or unusual occurrences such as a rare manifestation of a common disease or combinations of diseases. The main purpose of the case report literature is to provide helpful information for future similar cases and plays an important role in medical education.

As the case report corpus is different in that it encompasses less rigorous scientific evidence, the diagnosis made in the case report may be questioned and there may be many articles for some diseases.

Additionally, the shear amount of case reports available is a hindrance to the usefulness. Furthermore, in contrast to other very authoritative consensus sources (e.g. as listed above), case reports are anecdotal and often speculative. This makes the use of them challenging, both because of larger scale (at least 500.000 case reports e.g. are available in PubMed) but also because ranking should in addition to the match with the query also needs to handle these appropriately.

This is achieved by taking into account the trustfulness of the source.

More specifically, a trustfulness score is assigned for each document or group of similar documents that is taking into consideration by the ranking algorithm so e.g. documents with a relatively low trustfulness score is disregarded or weighted less e.g. depending on how low the score is. A trustfulness score may e.g. combine different indicators of the authoritativeness of the document such as who cites it, and/or in what journal or domain did it come from, who authored it and so on.

For example, a case report article, e.g. a Wikipedia article, will get a somewhat lower trustfulness score than a medical article which contains expert judgement.

Figures 2, 3:
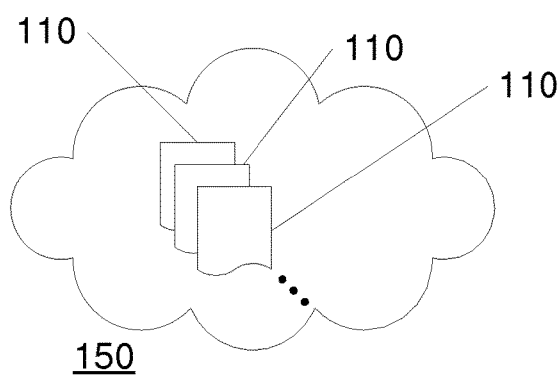
FIG. 2 schematically illustrates a representation of one embodiment of an index for a collection of digital information comprising a number of digital documents.
FIG. 3 schematically illustrates a collection of digital information comprising a number of digital documents.

FIG. 2 schematically illustrates a representation of one embodiment of an index for a collection of digital information comprising a number of digital documents.

Shown is a schematic representation of an index 300 that may be used in connection with the various embodiments and variations as described throughout the description.

The exemplary index 300 comprises information about which documents of the collection that contains a given search term and potentially additional search related metrics about one or more relations between a given search term, the given documents of the collection, and possibly the collection. The search related metrics may be used by the ranking steps of the method.

More specifically, the index 300 comprises a unique identifier 'Document (D)' (Doc_x, Doc_y, . . . ) of every document 301 being part of the collection and a total number |C| (XXX) of documents in the collection 306. For each document 301, the index further comprises a total number |D| (|Doc_x|, |Doc_y|, . . . ) of query terms in the given document 305 and every query term 'Term (q_i)' 303 (Word_A, Word_B, Word_C, Word_D, Word_F, ... ) for the given document 305.

As mentioned some general and/or non-relevant terms like 'the', 'a', and so on may have been removed or omitted from the index.

Additionally, the index 300 comprises for each query term 'Term (q_i)' of each document 'Document (D)', the frequency 303 'Freq. (fq_i; D)' ((fWord_A; Doc_x); (fWord_B; Doc_x); (fWord_C; Doc_x); (fWord_A; Doc_y); (fWord_D; Doc_y); (fWord_F; Doc_y); ... ) of that particular term in each document it is comprised in.

Finally, in this specific example, the index 300 comprises for each term 'Term (q_i)', the frequency 304 'Freq. (cq_i)' ((cWord_A); (cWord_B); (cWord_C); (cWord_D); ... ) of that particular term in the entire collection of documents.

As mentioned this information may advantageously be used for ranking documents retrieved by carrying out a search.

It is to be understood that although the index of FIG. 2 is illustrated as a table, the information will typically be stored in an efficient data structure, normally efficient both with relation to required storage space and/or information retrieval, as generally known in the art. Such a data structure may e.g. be a suitable suffix tree structure, Inverted Index structure, Ngram index structure, Document-term Matrix structure, etc.

FIG. 3 schematically illustrates a collection of digital information comprising a number of digital documents.

Schematically shown is a collection of digital information 150 comprising a number of digital documents 110. The various embodiments and variations of the searching method and/or system as described throughout the description may be used to search for relevant documents 110 as described.

FIG. 4 schematically illustrates relations or connections between different digital documents that may be used in a suitable user interface to browse a feature space instead of a normally vastly larger document space.

Schematically illustrated are a number of digital documents 110, where some documents are related to other documents according to various types of relations or features. For medical systems, examples of different features may e.g. be symptoms, family history, medication, demographics, age, etc.

In the shown (simple) example, the leftmost document is related to three other documents by two different features (which e.g. as an example could be 'age' and 'symptoms'). The different features are distinguished in the drawing by an arrow line and an arrow line with a smaller crossing line.

In the shown example, the leftmost document is related to the top and middle right documents by one (first) feature and related to the middle and lower documents by another (second) feature while the middle document is related to the top document according to the second feature.

In that way, the user will be able to see not only which documents are similar, but also how they are similar, and then use his expertise to judge which features are most relevant in the given case.

The advantage of this approach is that the user will have an option of browsing the feature space instead of the vastly larger document space. The user may choose whether the graph should be based on all features at the same time, or only on an importance weighted subset of the features that she finds most relevant (e.g. age and symptoms).

Providing this functionality e.g. requires extractions of features from documents and deciding or determining which will be important and/or significant. As mentioned, the relations and documents may be likened to a graph with nodes and edges and could be presented in such a way to a user, or alternatively, be presented in some other suitable way.

Clustering methods, such as various inductive clustering methods (e.g. LDA (Latent Dirichlet Allocation) as well as transductive (or semi-supervised) methods such as transductive support vector machines (TSVM) may be used to extract the features to discriminate between and link the various documents.

It should be noted, that this way of presenting and browsing documents generally is independent of whatever search retrieved the documents in the first place. It may also be usable just for a collection of documents sharing common features, i.e. not relating to searching.

The above mentioned methods usually represent each document as a term histogram (bag of words). To extract more detailed semantic meaning, it is necessary to use statistical modeling of the document as a sequence of terms. Using sequence models such a recurrent deep learning models as for example used in the word2vec framework could have superior performance in extracting semantic regularities such a synonymous or analog disease descriptors.

Accordingly, the method for searching a collection of digital information may comprise use of statistical modelling (e.g. use of statistical modelling results) that shows relevant relations between terms in documents. The statistical modelling may be performed by analyzing a large number of documents, e.g. documents in the index or other database, and extracting statistical information showing e.g. a relation-score of how often a term appears in relation to one or more other terms. For example, the statistical modelling may provide information that e.g. "discomfort in lower back" is related to, i.e. semantically close to, "slight pain in lower back" with a given relation score.

The use of statistical modelling may be based on predetermined statistical modelling results, i.e. results extracted by running a statistical modelling algorithm on the documents in the index or other collection of documents wherein the results may be in the form of a list of terms and their statistically related terms. Optionally, the results may include the statistical strength of the relationships, e.g. the relation score for different relations.

Thus, according to an embodiment the method for searching comprises using predetermined statistical modelling results to identify terms that are statistically related to the search terms or terms in the documents. The terms and their relations may be comprised by the predetermined statistical modelling results, e.g. a database of the predetermined statistical modelling results.

Accordingly, in a possible embodiment, the predetermined statistical modelling result comprises relations between terms obtained from a plurality of digital documents, wherein relations (e.g. individual relations between terms, e.g. a relation between a term in one document and a related term in a different document or the same document) comprises a statistical strength indicating the probability that the related terms are related.

The plurality of digital documents may be an arbitrary collection of documents. For example, the plurality of digital documents may be constituted, at least in part, by the documents of the collection of digital information (150). Accordingly, in an embodiment the plurality of digital documents used for statistical modelling comprises at least some of the documents of the collection of digital information (150), possibly in combination with other documents.

Accordingly, the method may comprise using the statistical modelling on the index, e.g. in connection with updates of the index, in order to update the predetermined statistical modelling results for use in subsequent searches and/or ranking.

The statistical modelling results may be used to augment terms in a search query with related terms obtained from the statistical modelling results, and/or augment the index with such terms that are statistically related to terms in documents.

Alternatively, or additionally, the statistical modelling results may be used in ranking of the search results, e.g. by increasing the ranking score of a document if that document contains terms which according to the statistical modelling results are statistically related to terms in the search query.

The method for searching may be adapted to retrieve gene information from the searched documents. Accordingly, the method of for searching may be specifically adapted for diagnosing genetic diseases.

Accordingly, the method may comprise a step of extracting gene names from the documents in the search result, and a step of presenting the search result dependent on an estimated relevance of the extracted gene names.

For example, the estimated relevance of a given extracted gene name may be determined dependent on the number of documents from the search result wherein the gene name appeared. The presentation of the gene names may be performed by presenting the extracted gene names in order of the estimated relevance, e.g. so that the gene name which appeared in most documents is shown as the most relevant gene.

Alternatively, or additionally, the presentation may comprise a step of clustering the documents in the search result according to gene names appearing in the documents, possibly according to the estimated relevance of the extracted gene names. Accordingly, all documents from the search which contains a specific gene name may be clustered into one group associated with that gene name. Other clusters of documents which contains other gene names may be presented, possibly as a list of clusters in the order of the estimated relevance of the genes.

For example a search query containing the search term paradentosis could return the gene names of genes altered in diseases related to paradentosis, such as gene names CPPI and EDS8. The method may further present these diseases associated with the search query such as Periodontosis and Ehlers-Danlos syndrome.

Figure 5:
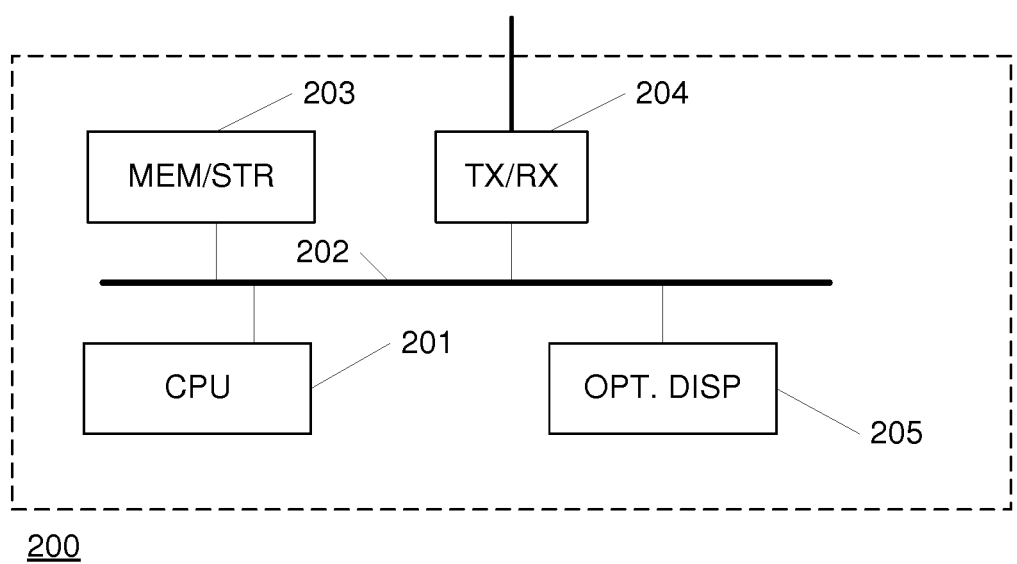
FIG. 5 schematically illustrates one embodiment of a system implementing embodiments of the method and alternatives as described elsewhere.

FIG. 5 schematically illustrates one embodiment of a searching system implementing embodiments of the method and alternatives as described elsewhere.

Shown is a searching device or system 200 (forth only denoted system) comprising at least one processing unit 201 connected via one or more communications and/or data buses 202 to an electronic memory and/or storage 203, optional communications elements 204 e.g. for communicating via a network, the Internet, a Wi-Fi connection, and/or the like, and an optional display 205.

The system 200 may be a more or less standard computational device, e.g. like a PC, computer, server, etc. and is suitably programmed to carry out or execute the searching method(s) and embodiments thereof as described throughout the specification and variations thereof.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements.

The mere fact that certain measures are recited in mutually different dependent claims does not indicate that a combination of these measures cannot be used to advantage.

It will be apparent to a person skilled in the art that the various embodiments of the invention as disclosed and/or elements thereof can be combined without departing from the scope of the invention as defined by the claims.

The invention claimed is:

1. A method of searching a collection of digital information comprising a number of digital documents describing rare or orphan diseases, the method comprising:
   electronically receiving or obtaining a search query, the query comprising a number of search terms,
   electronically searching an index using the search terms of the search query, thereby providing information about which digital documents of the collection of digital information contains a given search term and one or more search related metrics,
   electronically ranking at least a part of the search result according to one or more predetermined criteria providing a ranked search result, and providing at least a part of the ranked search result,
   wherein the ranking is performed according to a determined relevance of individual documents in the least a part of the search result,
   wherein the method comprises augmenting search terms in a document in the index with similar equivalent terms having the same meaning using topic models learning co-variation patterns across the search terms and the digital documents and wherein the similar equivalent terms are included in or added to the index, and
   wherein the ranking is performed by electronically calculating a sum of probabilities of the search terms contained in digital documents of the search result and ranking according to the calculated sums, the index and the one or more search related metrics being used in ranking the relevant documents being retrieved.

2. The method according to claim 1, further comprising using predetermined statistical modelling results, the predetermined statistical modelling results comprising relations between additional terms obtained from a plurality of digital documents and the search terms or terms in the documents, wherein the relations comprise a statistical strength indicating a probability of relatedness between the terms.

3. The method according to claim 1, wherein the method further comprises extracting gene names from the documents in the search result, and presenting the search result dependent on an estimated relevance of the extracted gene names.

4. The method according to claim 3, wherein the method comprises presenting the extracted gene names in order of the estimated relevance, or clustering the documents in the search result according to gene names appearing in the documents and according to the estimated relevance of the extracted gene names.

5. The method according to claim 3, wherein the method is applied to the diagnosis of a genetic disease.

6. The method according to claim 1, wherein one or more digital representations of at least one relation for a given digital document to at least one other given digital document and a type or description of the relation(s) is stored and wherein the method comprises presenting, in a graphical user interface, the digital documents and their relation(s) and their type(s) to a user, whereby a user may see which documents are related and by what type and furthermore be able to navigate or browse the documents using the relation(s).

7. The method according to claim 1, wherein the digital documents are medically related and the method comprises clustering digital documents of the at least a part of the ranked search result together according to concepts of the standardized Unified Medical Language System resulting in a clustered search result.

8. The method according to claim 7, wherein the selected cluster is expanded to reveal information on the documents it contains when the clustered search result is presented and if selected by a user.

9. The method according to claim 1, wherein the method comprises assigning a trustfulness score to each digital document or to a group of similar digital documents where the trustfulness score is taken into consideration during ranking so digital documents with a relatively low trustfulness score is disregarded or ranked less.

10. The method according to claim 1, wherein the method further comprises using ontologies to identify multi-word terms, synonyms, and symptoms identified in the digital document when the document is medically related.

11. The method according to claim 1, wherein the method further comprises explicitly taking into account search query and digital document context by binding concepts together from sentence units.

12. The method according to claim 1, wherein the digital documents relate to rare or orphan diseases.

13. A system for searching a collection of digital information comprising a number of digital documents, the system comprising at least one processing unit and an electronic memory and/or storage, wherein the system is configured to execute the method according to claim 1.

14. The method according to claim 1, further comprising using a smoothing function in the ranking to provide robust likelihood for the search terms using the one or more search related metrics to increase the number of relevant retrieved documents ranked high.

15. The method according to claim 14, wherein the smoothing comprises Dirichlet smoothing or Jelinek-Mercer smoothing or a combination thereof.

16. The method according to claim 1, comprising using predetermined statistical modelling results to identify one or more additional terms comprised by the predetermined statistical modelling results that are statistically related to the search terms or terms in the documents, wherein at least one of the search related metrics specifies the additional terms and/or specifies the one or more relations between the additional terms and the search terms or terms in the documents.

* * * * *